Aug. 3, 1971   S. DICKFELDT ET AL   3,597,277

ELECTRODE SET FOR GALVANIC CELLS

Filed Oct. 8, 1969

INVENTORS
KARL STEFFENS
SIEGFRIED DICKFELDT

BY *Stryker & Jacobson*

ATTORNEYS

United States Patent Office 3,597,277
Patented Aug. 3, 1971

3,597,277
ELECTRODE SET FOR GALVANIC CELLS
Siegfried Dickfeldt, Berliner Str. 70, Hagen, Germany, and Karl Steffens, Vaehalle Muhlenbrinkstr. 34, Hagen-Vorhalle, Germany
Continuation-in-part of application Ser. No. 665,039, Sept. 1, 1967. This application Oct. 8, 1969, Ser. No. 864,718
Int. Cl. H01m 5/00
U.S. Cl. 136—1134R
4 Claims

ABSTRACT OF THE DISCLOSURE

The flat-plate like electrodes in a battery, and particularly those in alkaline button cells, are formed in sets with plates having identical geometry and being stacked above one another and the interconnection between adjacent electrode plates of the same set being made within the confines of the structure defined by the stack of plates. Two sets of opposite polarity electrodes made in this fashion can be meshed together with suitable separator and electrolyte material in between to form a completed battery.

CROSS REFERENCE TO RELATED INVENTIONS

This application is a continuation-in-part of our application filed Sept. 1, 1967, Ser. No. 665,039, now abandoned, and assigned to the same assignee as the present invention.

BACKGROUND OF THE INVENTION

The present invention relates to electrode sets for galvanic cells, especially for alkaline accumulators.

Alkaline accumulators contain electrode sets in alternating series of positive and negative electrodes, with the plates of common polarity being interconnected by electrically conductive straps to form an independent single polarity electrode set. Separators are arranged between the individual plates. Electrode sets in alkaline accumulators with steel housings must be insulated. At least the connection straps of one polarity electrode set must be insulated from the housing. It has been suggested therefore to provide the connection straps with an insulating varnish. This method rather complicates the manufacturing process and could not be made popular. If the connection straps are not provided with an insulating varnish, the whole electrode set must be insulated by a separator covering against the housing. The connection straps of known embodiments lie outside the interior of the geometrical form of the electrodes, which is necessary for various production reasons and they should be safely insulated between the electrodes. These external connection straps will quite often press through the insulation of customary plate sets.

It is an object of the invention therefore, to construct an electrode set to which these disadvantages do not apply, yet which is easy to assemble and stable enough as to be safeguarded against displacement and shifting. This object is achieved by leaving an edge of each electrode plate, which is preferably circularly shaped, within an electrode set partially free from active mass and interconnecting those parts which are free from the mass to the free parts of the edges of the adjacent plates in the set. The parts of the edge being free from mass, hereinafter sometimes referred to as "mass-free" pieces of the edge, are preferably on one side of the plates. Those parts of the edge serving as connecting members for two adjoining plates do not necessarily lie exactly one below the other but may be laterally shifted as to have the interconnecting parts of the edge serve at least in part as transversal connection straps. In the whole electrode set, which may comprise as many plates as desired, the transversal connections run parallel to each other.

The mass-free edges connecting two adjacent plates in a set may also lie below one another and be connected as to provide a zig-zag connection between the plates along one side of the electrode set.

BRIEF SUMMARY OF THE INVENTION

A plurality of identically disc-shaped electrode plates are spaced from one another and arranged in stacked relationship. The plates have chordal cut-away areas and electrically conductive tabs in the cut-away areas so that the tabs can extend angularly from a plate to make connection with the next adjacent plate in the electrode set at the edge of its corresponding cut-away area. This produces an electrical interconnection between the electrode elements in the set within the confines of the geometry of the stack defined by the electrode plates.

BRIEF DESCRIPTION OF THE DRAWING

In the drawings similar parts are identified with the same reference numeral.

DESCRIPTION OF THE PREFERRED EMBODIMENT

The substantial circular disc-like electrode plates 11, 12, 13, and 14 are made in any convenient manner out of a matrix coated with a suitable active mass. Along one edge or chordal section of each of the plates, the active mass is removed.

Figure 1:
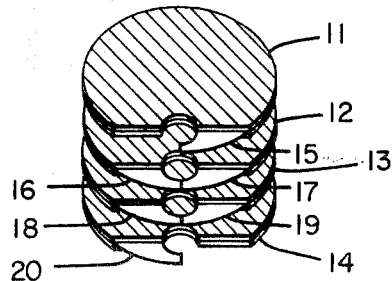
FIG. 1 is a top-front perspective view of an embodiment of the invention showing a stack of four substantially circular plates with mass-free edges before they are connected together.
Figure 2:
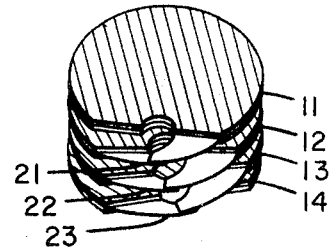
FIG. 2 is a top-front perspective view of the four plates shown in FIG. 1 connected together to form an electrode set.
Figure 3:
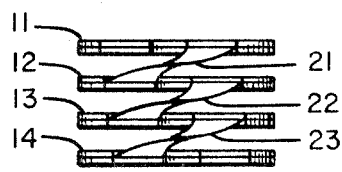
FIG. 3 is a front view of the embodiment illustrated in FIG. 2.

Top and bottom electrodes 11 and 14 respectively are provided with single-mass-free pieces of edge 15 and 20 respectively and electrodes 12 and 13 are provided with two mass-free pieces 16, 17, 18 and 19. These mass-free pieces of the edges can be connected by overlapping the mass-free pieces of adjacent electrode plates and then spot welding or mechanically connecting them together. FIGS. 2 and 3 show the plates in an electrode set connector in such manner. Plates 11 and 12 are connected by connector 21 which is formed from mass-free pieces 15 and 16. Similarly connector 22 is formed from mass-free pieces 17 and 18 and connector 23 is formed from mass-free pieces 19 and 20. These electrodes form one electrode set containing four electrode plates.

Two similarly formed electrode sets of opposite polarities can be wound into each other in a way resembling a spiral. One set would be enveloped by separators (not shown) so the electrode sets would not come in physical contact against each other. Preferably the separators are larger than the plates, so they may be closed around their external edges. The electrode set is then also laterally enveloped by a separator cover and electrically insulated against the housing. Only the end plates are not covered by separators. As the interplate connection straps lie within the confines defined by the geometric form of the plates, the connection straps will not be forced out and press through the insulation, which has often been the case with customary plate sets.

Figure 4:
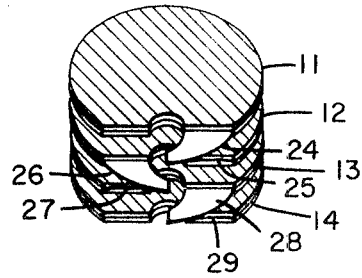
FIG. 4 is a top-front perspective view of the plates of FIG. 1 connected together in a different manner.
Figure 5:
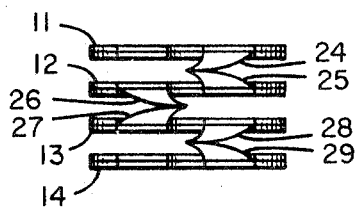
FIG. 5 is a front view of the embodiment illustrated in FIG. 4.

FIGS. 4 and 5 illustrate another embodiment of an electrode set, wherein the mass-free pieces of the edge by which two plates are connected together lie below one another, pair by pair, and are interconnected pair by pair, preferably by welding. This will provide an electrode set wherein the plates are connected by straps arranged in a somewhat zig-zag form. The edge pieces 24 and 25, 26 and 27, and 28 and 29, are respectively interconnected to form a four plate electrode set. As mentioned earlier, the advantage of the electrode set constructed according to the teachings of this invention lies in providing the connections between the single plates all within the confines of the geometric form of the plates. This provides remarkable progress in simplifying and improving the insulation of the electrodes against contact with the steel housing.

The electrode sets constructed according to the teachings of this invention bring an additional advantage, as two differently poled sets may be assembled together while still being safeguarded against being displaced or shifted. This safeguarding can be increased by welding the edges of the separators enveloping both electrode sets together. A cell made up of two electrode sets according to FIG. 2 is especially stable and safe from displacement because the electrode sets are joined together in a spiral fashion and the interconnecting connection straps of both sets will practically eliminate any displacement.

The mass-free parts of the edge consist preferably of the same material as the one used for the matrix of the active mass. They may be obtained for instance by removing part of the active mass which ordinarily covers the matrix material. The following method may be followed for production. The electrode plates are punched from a band, which has been already equipped with active mass. The bands may be provided with a mass-free edge in the usual accepted manner. The punching process may be done in a manner to provide the edge pieces and the mass-free edges as taught by this invention. A subsequent step for removal of the active mass may thereby be eliminated. In alkaline accumulators the edge parts consist primarily of nickel. In sealed alkaline accumulators wherein the gases evolved during the operation have to be consumed, the gas consumption is effectively improved when using the electrodes constructed according to the teachings of this invention and is far better than other known embodiments. The gas consumption, for example, takes place where the gases evolve, i.e. in the internals of the separator-enveloped electrode unit.

We claim:

1. A set of electrode elements for a galvanic cell, comprising: a plurality of identically shaped electrode plates spaced from one another arranged in stacked relationship, the edges of said plates defining a generally cylindrical geometry; each of said plates having cut-away mass-free areas; electrically conductive tabs in said cut-away areas, said tabs extending angularly from said plates and connected with the tabs of the next adjacent plates in the electrode set whereby the electrical interconnections between the electrode elements in the set are made within the confines of the generally cylindrical geometry of the stack defined by the electrode plates.

2. The electrode set as in claim 1 wherein said plates are disc-shaped and the cut-away areas are general chordal sections.

3. The electrode set as in claim 2 wherein the plates are stacked with the chordal sections located over one another whereby interconnection between plates is made substantially down one side of the stacked plates.

4. The invention as set forth in claim 1 further including: a second set of electrode elements arranged and interconnected in the same manner as the first-mentioned set, said second set being meshed with said first-mentioned set so that between each pair of adjacent electrode elements from one set there is an electrode from the other set.

References Cited

UNITED STATES PATENTS

| | | | |
|---|---|---|---|
| 342,594 | 5/1886 | Gibson | 136—18 |
| 408,002 | 7/1889 | Ernst | 136—17 |
| 2,861,115 | 11/1958 | Berg | 136—134 |
| 2,971,999 | 2/1961 | Jacquier | 136—6 |
| 3,169,889 | 2/1965 | Zahn | 136—6 |
| 3,268,363 | 8/1966 | Steffens | 136—134 |

DONALD L. WALTON, Primary Examiner